Figure 5:
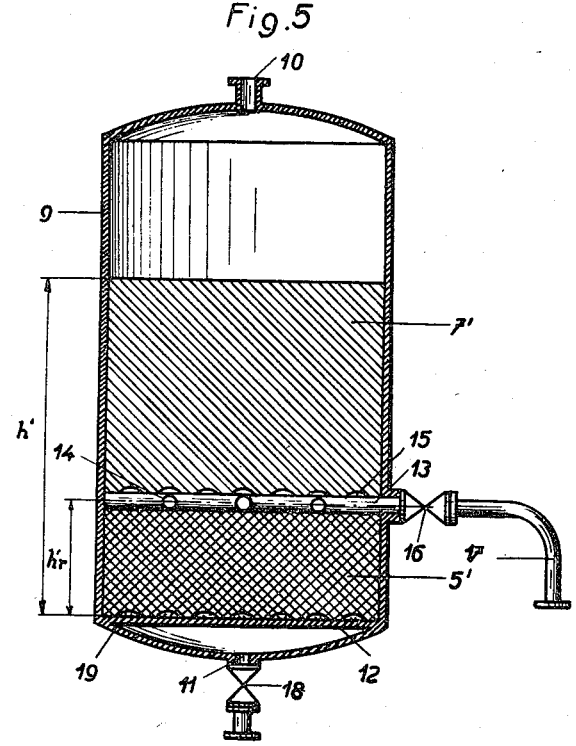

July 24, 1951        J. WUNSCH        2,561,834
PROCESS OF REGENERATING EXCHANGEABLE FILTERS
Filed Feb. 2, 1949        2 Sheets-Sheet 1
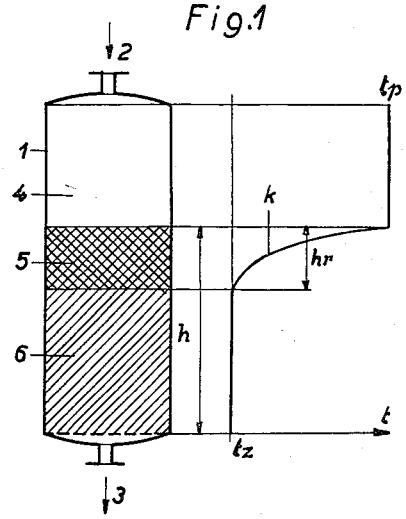
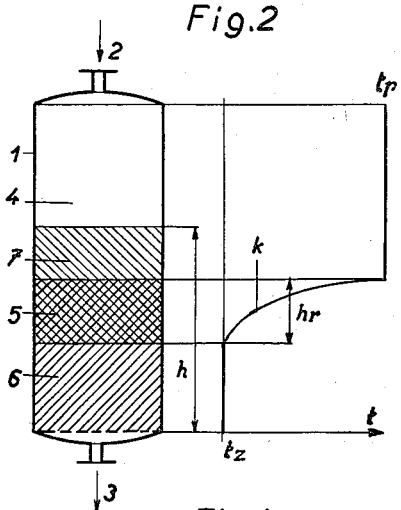
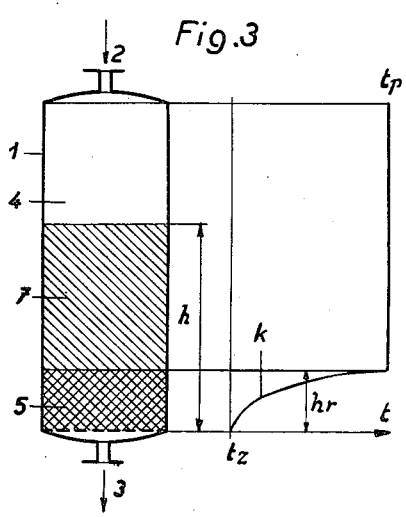
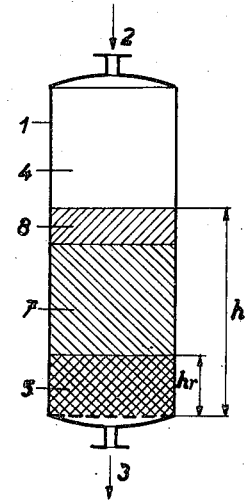
INVENTOR
BY
ATTORNEY July 24, 1951  J. WUNSCH  2,561,834
PROCESS OF REGENERATING EXCHANGEABLE FILTERS
Filed Feb. 2, 1949  2 Sheets-Sheet 2

INVENTOR
Josef Wünsch
BY
ATTORNEY

Patented July 24, 1951

2,561,834

UNITED STATES PATENT OFFICE 2,561,834

PROCESS OF REGENERATING EXCHANGEABLE FILTERS

Josef Wünsch, Dolni Mokropsy, Czechoslovakia, assignor to Czechoslovak Metal & Engineering Works, National Corporation, Prague, Czechoslovakia Application February 2, 1949, Serial No. 74,144
In Czechoslovakia February 9, 1948

1 Claim. (Cl. 23—50)

The process of softening water in so-called exchangeable filters consists, in principle, in substituting the cations, for example of sodium, bound in the active groups of the exchange masses by the cations of calcium and magnesium contained in the inflowing hard water. The calcium and magnesium salts of the hard water are converted, through the contact with the active mass into the respective sodium salts which do not cause water hardening so that the outflowing water is softened and does not form any scale when used for example as feed water for boilers.

As soon as the active groups of the exchange mass in the filter are saturated with the cations of the salts contained in the water, which saturation results in an increase of the residual hardness of the filtrate, the softening capacity of the filter begins to weaken. In order to restore this capacity it is indispensable to remove the calcium and magnesium cations from the active groups of the exchange masses. For such regeneration purpose a regenerant solution, for example of sodium chloride is passed through the layer of the active mass (exchanger) thus substituting the cations of the calcium and magnesium salts by adequate amounts of sodium from the regenerant brine.

To illustrate this known process reference is made to Figs. 1 to 4 of the accompanying drawing showing diagrammatically an exchangeable filter of the type referred to in its various working phases indicated by the respective diagrams.

The cylindrical filter tank 1 which is provided at its top with an inlet 2 and at its bottom with a discharge 3 is filled up to the level $h$ with the active exchange mass. The hard water entering at 2 is filling first the space 4 and then gradually penetrates the layers 5, 6 of the exchange mass. In the layer 5 referred hereafter to as reaction layer occurs the exchange of calcium and magnesium cations for sodium cations so that the layer 6 is entered by a water already softened causing no changes in this latter layer. This is obvious from the diagram shown in Fig. 1 showing the reduction of the original hardness $t_p$ of the inflowing water according to the curve $k$ down to the residual hardness value $t_z$.

During the flow of the softened water through the filter its active mass is being exhausted so that after a certain time arises the state according to Fig. 2 is reached, the layer 7 being entirely exhausted so that the hardness of the water therein is not altered. At this stage the reaction layer 5 has shifted towards the discharge 3 and the level of the not yet affected active layer 6 reduced. Finally the state according to Fig. 3 is reached, where the reaction layer 5 just reached the bottom of the filter and the height of the spare layer 6 is brought down to zero. If the water would continue flowing through it would be discharged at 3 out of the filter at an ever growing residual hardness until finally after the full exhausting of the reaction layer 5 the filter would not soften the water at all. It is obvious that the filter can not remain in use up to the time when such a state is reached. Fig. 3 represents the state at which it is indispensable to eliminate the filter from operation and to start its regeneration.

This has hitherto been carried into effect by introducing into the filter at 2 a solution of sodium chloride passing the same through the exchange filling mass of the filter and discharging the same at 3, that is in the same way as the water to be softened during operation. During this process the calcium and magnesium ions of the exchange mass are replaced by the sodium ions out of the regeneration brine or, in other words, an inverted chemical process takes place than at the water softening.

On the admission of the regenerative solution into the filter, which has been exhausted to a degree as shown in Fig. 3, a layer 8 (see Fig. 4) of the active mass is regenerated within a certain first time interval, that is, out of said layer the calcium and magnesium ions are driven out at once and replaced by the sodium ions out of the regenerative solution. The outdriven calcium and magnesium ions pass through the layer 7 which had been entirely exhausted, without any change whatsoever and only in the layer 5, which is only partially exhausted, do they replace the strong concentration the sodium ions which are discharged as a secondary generated sodium chloride solution into the outlet 3. In this way said layer 5 (see Fig. 4) is fully exhausted only during the subsequent regeneration process. The said layer 5 is thus saturated with calcium and magnesium ions and with the progressing regeneration, when the regenerated layer 8 reaches the bottom of the filter 1, it is again saturated with sodium ions. Under such conditions the regeneration requires a much higher amount of regenerative substance than would be required in the absence of the above described phenomenon.

The object of the present invention is to eliminate the above described drawbacks. The main feature of the improvement according to the invention consists in such conduct of the regeneration that the residual amount of sodium ions in the layer 5 (Fig. 4), which is only partly exhausted, will not be deteriorated. This is achieved by regenerating the layer of active mass, which has been entirely exhausted during the operation of the filter, separately from the layers which have been exhausted only partially.

Figure 6:
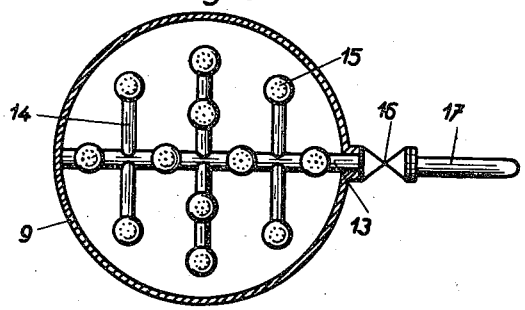

The process of regeneration according to the invention will be more fully described with reference to Figs. 5 and 6 showing diagrammatically and merely by way of example, an embodiment of a suitable apparatus in a sectional and a plan view, respectively.

Inside the filter casing 9 provided at the top with an inlet 10 for the hard water and at the bottom with a discharge 11 for the softened water, a permeable partition or division 13 is placed at a level $h_r$ from the decanting or sifting bottom 12, said partition 13 being formed by a grate of tubes 14 with decanting or straining heads 15. Said tubes 14 are attached through valves 16 to a common collecting tube 17. The discharge 11 is closable by a valve 18. The decanting bottom 12 is provided with well known decanting or straining heads 19 and supports a layer of an active exchange material up to the level $h'$. The distance $h_r$ of the division 13 from the bottom 12 corresponds to the height of the reaction layer $r'$ separating in normal softening operation the fully exhausted upper layer of the exchange mass from the fully unaffected lower layer.

In operation the valve 16 is closed and the filter is exhausted by the flow of water in the direction from the inlet 10 towards the discharge 11 until the attenuated reaction layer 5' extends between the partition 13 and bottom 12 which corresponding state is shown in Fig. 5. Thereupon the filter is put out of action for regeneration. The regenerant solution is introduced from the top at 10, the valve 18 of the discharge 11 is closed and the valve 16 opened. As soon as the regenerant solution has passed through the layer 7' up to the region of the partition 13, it will penetrate through the straining heads 15 into the tubes 14 forming said partition 13 and thereupon through the valve 16 into the collecting tube 17. The layer 5' of active exchange mass lying between the partition 13 and the decanting bottom 12 is therefore temporarily shut off from the passage of the regenerant solution which now passes only through the layer 7' located above said transition 13, said layer having been fully exhausted by the preceding filter operation. The calcium and magnesium ions driven out of said layer 7' by the regenerant solution are therefore prevented, contrary to the hitherto known procedure, from driving out the sodium ions from the partly exhausted layer 5'. After the completion of the regeneration of the layer 7', which may be determined by a hardness test of the water discharged from the tube 17, the valve 16 is closed and the valve 18 reopened. Then the regenerative solution is passing through the whole column of the mass having a height $h'$, that is through the layers 7' and 5' successively. During this process the remaining ions of calcium and magnesium are driven out of the layers 5' while the sodium ions remain owing to the equilibrium state prevailing in the active groups of the exchange mass of the layer 5' and are fully utilized in the following softening process.

The saving in regenerative material obtained by the process according to the invention are very substantial and amount up to about 30 percent of the whole amount required. It is to be understood that the constructional details of a softening filter used to operate in the above described manner on regeneration, may be modified in many ways particularly as to the shape of the container and as to the type and number of permeable partitions without departing from the scope of the invention.

What I claim as my invention is:

The method for regenerating exchange material in exchange filter tanks by passing a regenerant solution through the exchange material, said method comprising first passing the regenerant solution through the upper layers of the exhausted exchange material and drawing off said solution from the filter tank at a point intermediate the end thereof until the said upper layers are regenerated, and only thereafter passing the regenerant solution through the partly exhausted lower layers of the exchange material and discharging said solution at the bottom of the tank.

JOSEF WÜNSCH.

REFERENCES CITED

The following references are of record in the file of this patent:

UNITED STATES PATENTS

| Number | Name | Date |
| --- | --- | --- |
| 1,759,601 | Apeldorn | May 30, 1930 |
| 1,942,807 | Dotterweich | Jan. 9, 1934 |
| 1,978,447 | Austerweil et al. | Oct. 30, 1939 |

OTHER REFERENCES

Chem. and Met., vol. 54, No. 7, pages 123–130.